United States Patent
Flake et al.

(10) Patent No.: US 7,587,538 B2
(45) Date of Patent: Sep. 8, 2009

(54) DISK CONTROLLER, CHANNEL INTERFACE AND METHODS FOR USE THEREWITH

(75) Inventors: Lance Flake, Longmont, CO (US); John P. Mead, Longmont, CO (US)

(73) Assignee: Broadcom Corporation, Irvine, CA (US)

( * ) Notice: Subject to any disclaimer, the term of this patent is extended or adjusted under 35 U.S.C. 154(b) by 366 days.

(21) Appl. No.: 11/444,821

(22) Filed: Jun. 1, 2006

(65) Prior Publication Data

US 2008/0005457 A1    Jan. 3, 2008

(51) Int. Cl.
*G06F 13/12*    (2006.01)
(52) U.S. Cl. ................ 710/74; 360/46; 360/48
(58) Field of Classification Search ........... None
See application file for complete search history.

(56) References Cited

U.S. PATENT DOCUMENTS

| | | | |
|---|---|---|---|
| 5,088,058 A * | 2/1992 | Salsburg .................. | 703/25 |
| 5,610,808 A | 3/1997 | Squires et al. | |
| 5,829,011 A | 10/1998 | Glover | |
| 6,178,056 B1 | 1/2001 | Cloke | |
| 6,178,057 B1 * | 1/2001 | Kuroda et al. ............ | 360/51 |
| 6,278,568 B1 * | 8/2001 | Cloke et al. ............. | 360/51 |
| 6,452,737 B2 * | 9/2002 | Makiura et al. .......... | 360/65 |
| 6,580,573 B1 * | 6/2003 | Hull et al. ................ | 360/46 |
| 2007/0230004 A1 * | 10/2007 | Yen ......................... | 360/39 |

FOREIGN PATENT DOCUMENTS

| | | |
|---|---|---|
| KR | 10-0245896 | 3/2000 |
| WO | 9209036 A1 | 5/1992 |

OTHER PUBLICATIONS

Charles Kirtland, Brian Wolf, "Programmable, Single-Chip Controller Adapts to Different System Environments," Electro. Electronic Conventions Management, vol. 11, No. 21, 1986, Los Angeles, USA, pp. 1-9.

\* cited by examiner

*Primary Examiner*—Eron J Sorrell
(74) *Attorney, Agent, or Firm*—Garlick Harrison & Markison; Bruce E. Stuckman (57) ABSTRACT

A channel interface couples a channel circuit to a controller circuit of a disk drive, the channel circuit includes a channel register and the controller circuit includes a controller register used in the execution of read and write commands. The channel interface includes a bidirectional transmission path between the controller circuit and the channel circuit that is operable to transfer disk read data and disk write data, to provide the controller circuit access to read from, and write to, the channel register, and to provide the channel circuit access to read from, and write to, the controller register. The channel interface further includes a first unidirectional transmission path between the controller circuit and the channel circuit that is operable to transfer servo data from the channel circuit to the controller circuit.

21 Claims, 7 Drawing Sheets

DISK CONTROLLER, CHANNEL INTERFACE AND METHODS FOR USE THEREWITH

BACKGROUND OF THE INVENTION

1. Technical Field of the Invention

The present invention relates to disk controllers, disk drives and related methods.

2. Description of Related Art

As is known, many varieties of disk drives, such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

The disk drive includes a controller circuit that interfaces with the host device to execute read and write commands of the host. This disk controller generally includes one or more integrated circuits that control the operation of the drive devices, such as servo motors and voice coil motors used to spin the disk and to control the position of one or more read/write heads, that generate timing signals and the produce and decode the signals required to write data to and read data from the disk. When two or more integrated circuits are employed, an interface is required between these devices to facilitate the cooperation of these devices in the control of the disk drive.

Various limitations and disadvantages of conventional and traditional approaches will become apparent to one of ordinary skill in the art through comparison of such systems with the present invention.

SUMMARY OF THE INVENTION

The present invention sets forth a disk controller, channel interface and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

Figure 1:
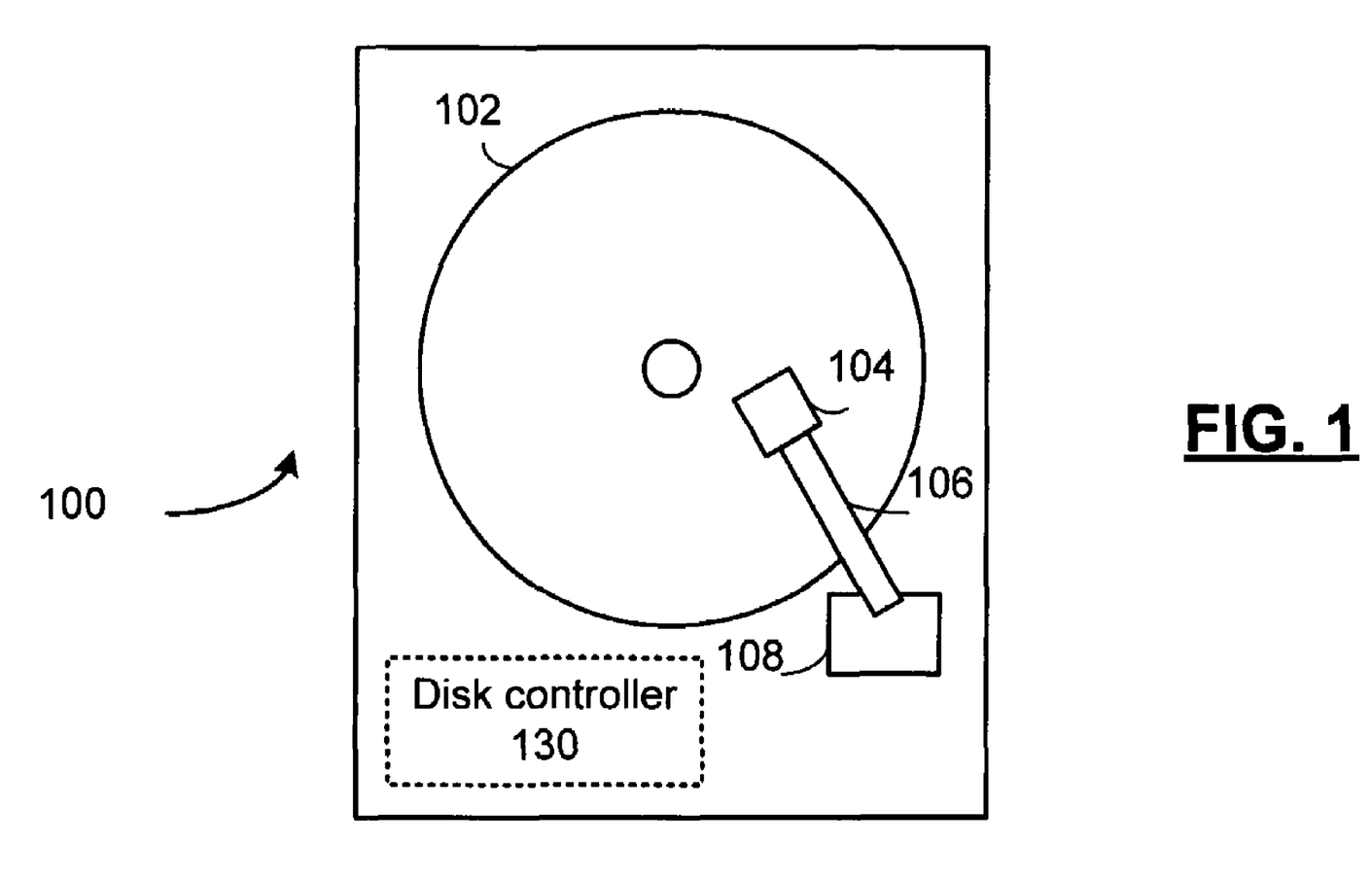
FIG. 1 presents a pictorial representation of a disk drive unit 100 in accordance with an embodiment of the present invention.

FIG. 1 presents a pictorial representation of a disk drive unit 100 in accordance with an embodiment of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In an embodiment of the present invention, disk 102 can be a magnetic disk that stores information as magnetic field changes on some type of magnetic medium. The medium can be a rigid or nonrigid, removable or nonremovable, that consists of or is coated with magnetic material.

Disk drive unit 100 further includes one or more read/write heads 104 that are coupled to arm 106 that is moved by actuator 108 over the surface of the disk 102 either by translation, rotation or both. In an embodiment of the present invention, the read/write heads 104 include a write element that writes data on the disk via longitudinal magnetic recording, perpendicular magnetic recording or other magnetic orientation.

A disk controller 130 is included for controlling the read and write operations to and from the drive, for controlling the speed of the servo motor and the motion of actuator 108, and for providing an interface to and from the host device.

Disk controller 130 includes one or more functions or features of the present invention, as described in further detail in conjunction with the figures that follow.

Figure 2:
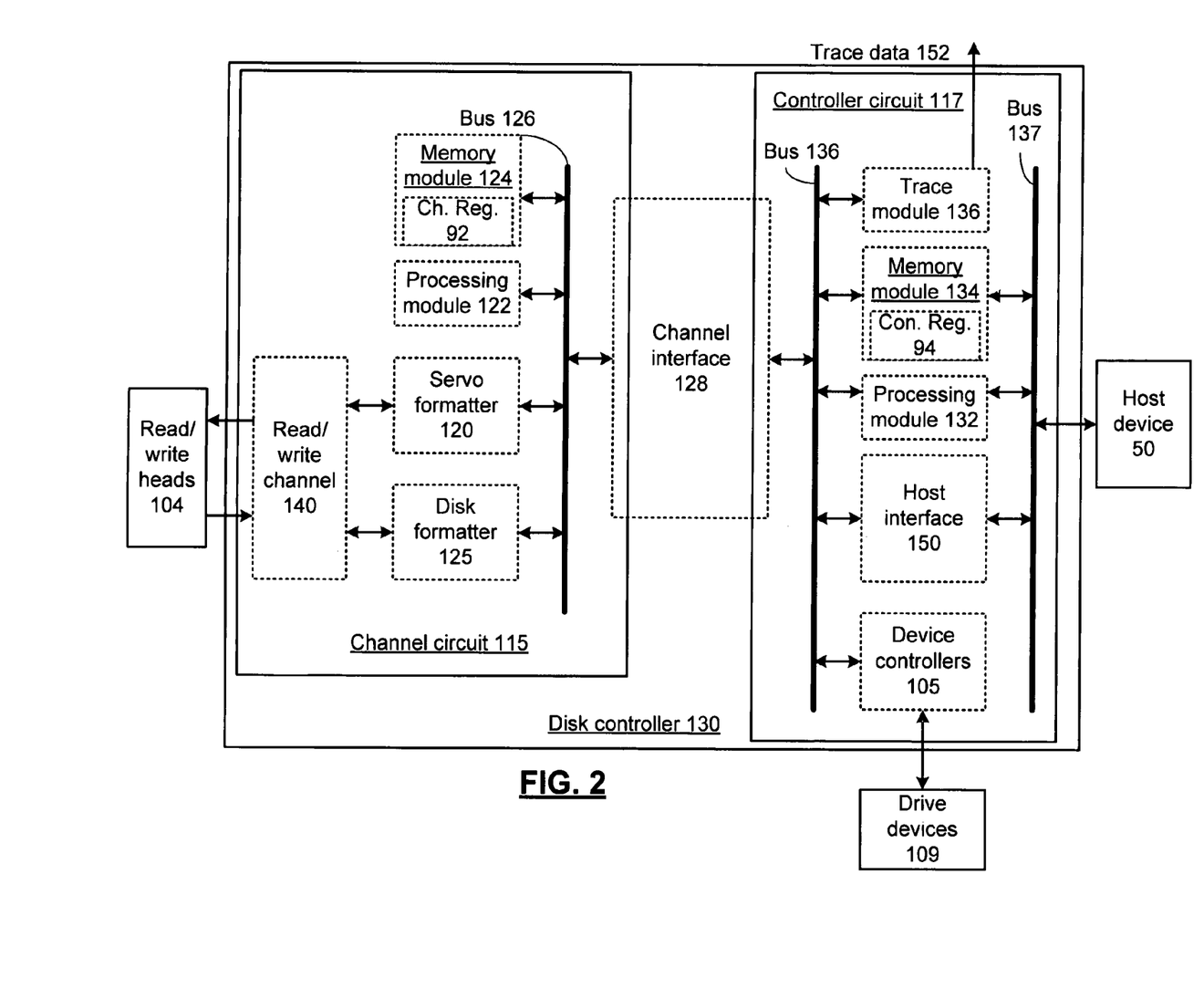
FIG. 2 presents a block diagram representation of a disk controller 130 in accordance with an embodiment of the present invention.

FIG. 2 presents a block diagram representation of a disk controller 130 in accordance with an embodiment of the present invention. In particular, disk controller 130 is implemented with a channel circuit 115 and controller circuit 117 that are coupled together via channel interface 128 to cooperatively perform the functions of disk controller 130. Channel circuit 115 includes a read/write channel 140 for reading and writing data to and from disk 102 through read/write heads 104. Disk formatter 125 is included for controlling the formatting of data and provides clock signals and other timing signals that control the flow of the data written to, and data read from disk 102, and servo formatter 120 provides clock signals and other timing signals based on servo control data read from disk 102. Controller circuit 117 includes device controllers 105 that control the operation of drive devices 109 such as actuator 108 and the servo motor, etc, a trace module 136, for collecting trace data 152, such as stack and register values, processor states and/or other implementation specific data that can be used to observe the internal operations of the disk controller 130, including channel trace data from the channel circuit 115 and other trace data from other modules of controller circuit 117. Trace module 136 provides the trace data 152 to an external device (not shown) for diagnostic purposes. Controller circuit 117 further includes a host interface module 150 that receives read and write commands from host device 50 and transmits data read from disk 102 along with other control information in accordance with a host interface protocol. In an embodiment of the present invention the host interface protocol can include, Advanced Technology Attachment (ATA)/Integrated Development Environment (IDE), Serial ATA (SATA), Fibre channel ATA (FATA), Small Computer System Interface (SCSI), Enhanced IDE (EIDE), MultiMedia Card (MMC), and Compact Flash (CF) or any number of other host interface protocols, either open or proprietary that can be used for this purpose.

Controller circuit 117 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulate signals (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes operational instructions to control the operation of drive devices 109, to arbitrate the execution of read and write commands and the flow of data between the host interface module 150 and the channel circuit 115, to gather trace data and to perform other functions of the drive.

Likewise, channel circuit 115 further includes a processing module 122 and memory module 124. Processing module 122 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulate signals (analog and/or digital) based on operational instructions that are stored in memory module 124. When processing module 122 is implemented with two or more devices, each device can perform the same steps, processes or functions in order to provide fault tolerance or redundancy. Alternatively, the function, steps and processes performed by processing module 122 can be split between different devices to provide greater computational speed and/or efficiency.

Memory module 124 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 122 implements one or more of its functions via a state machine, analog circuitry, digital circuitry, and/or logic circuitry, the memory module 124 storing the corresponding operational instructions may be embedded within, or external to, the circuitry comprising the state machine, analog circuitry, digital circuitry, and/or logic circuitry. Further note that, the memory module 124 stores, and the processing module 122 executes operational instructions to control the execution of read and write commands and the flow of data between the channel circuit 115 and controller circuit 117, to gather trace data from the channel that is provided to trace module 136 and to perform other functions of the drive.

Host interface module 150, as a whole, converts incoming data and commands from the host device 50 in its corresponding host interface protocol, into data and commands in a format used by disk controller 130. Conversely, data from read from disk drive unit 100 is converted by host interface module 150 from the format used by disk drive unit 100 into the particular host interface protocol used by the host device 50. In an embodiment of the present invention, the format used by the disk controller 130 can be a standard format such as Direct Memory Access (DMA) that is further implemented to support transfers of read and write data between the channel circuit 115 and the controller circuit 117 via channel interface 128. In particular, channel circuit 115 includes a channel register 92 and controller circuit 117 includes a controller register 94, that, in conjunction with channel interface 128, are operable to support DMA protocol data transfers and DMA control between the channel circuit 115 and the controller circuit 117. While channel register 92 is shown as a memory location of memory module 124, channel register 92 can be implemented as a register or memory that is either stand-alone, or implemented as part of another device, such as processing module 122. Similarly, while controller register 94 is shown as a memory location of memory module 134, controller register 94 can be implemented as a register or memory that is either stand-alone, or implemented as part of another device, such as processing module 132. Further details regarding the transfer of data between channel circuit 115 and controller circuit 117 via channel interface 128 are presented in conjunction with the discussion of FIGS. 3 and 4.

Disk controller 130 includes a plurality of modules, in particular, device controllers 105, trace module 136, processing modules 122 and 132, memory modules 124 and 134, read/write channel 140, disk formatter 125, servo formatter 120 and host interface module 150 that are interconnected via channel interface 128 and buses 126, 136 and 137. Each of these modules can be implemented in hardware, firmware, software or a combination thereof, in accordance with the broad scope of the present invention. While a particular bus architecture is shown in FIG. 2 with buses 126, 136 and 137, alternative bus architectures that include fewer or additional data buses, and/or alternative connectivity, such as direct connectivity between the various modules, are likewise possible to implement the features and functions included in the various embodiments of the present invention.

In an embodiment of the present invention, channel circuit 115 and controller circuit 117 are each implemented with an integrated circuit such as a system on a chip integrated circuit. In an embodiment of the present invention, these system on a chip integrated circuits include a digital portion that can include additional modules such as protocol converters, linear block code encoding and decoding modules, etc., and an analog portion that includes additional modules, such as a power supply, disk drive motor amplifier, disk speed monitor, read amplifiers, etc. In a further embodiment of the present invention, the various functions and features of channel circuit 115 and/or controller circuit 117 are implemented using two or more integrated circuit devices that communicate and combine to perform the functionality of channel circuit 115 and/or controller circuit 117 in conjunction with channel interface 128.

Further details regarding channel interface 128 including additional novel features and functions will be described in conjunction with the figures that follow.

Figure 3:
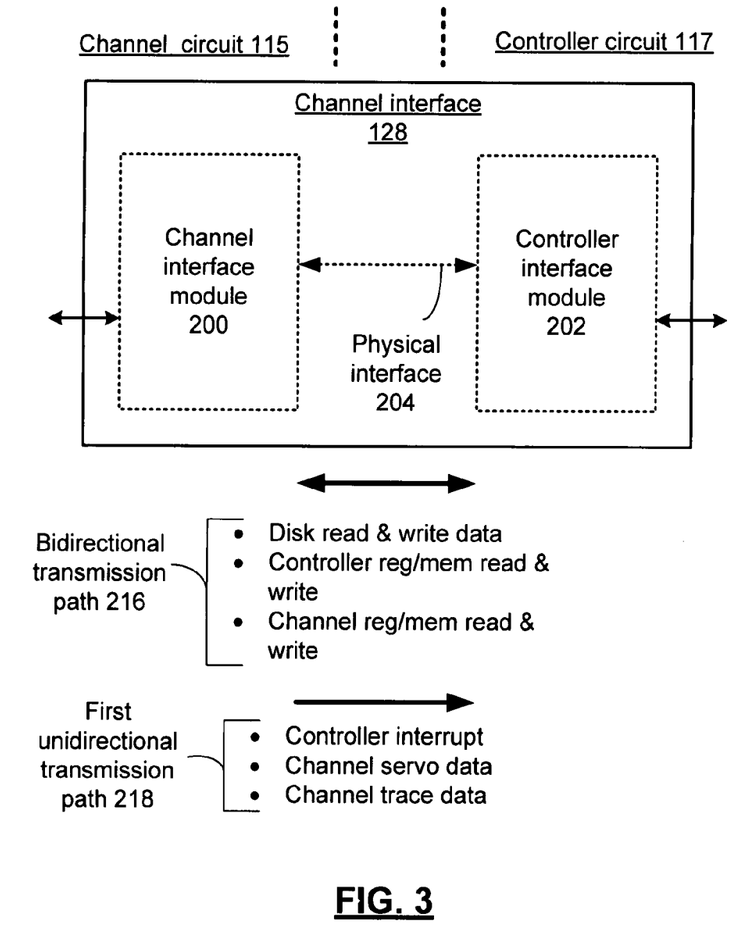
FIG. 3 presents a block diagram representation of a channel interface 128 in accordance with an embodiment of the present invention.

FIG. 3 presents a block diagram representation of a channel interface 128 in accordance with an embodiment of the present invention. In particular, channel interface 128 is presented that includes a channel interface module 200 of channel circuit 115 that is coupled to controller circuit 117 via a physical interface 204 and controller interface module 202. In the embodiment of the present invention where channel circuit 115 and controller circuit 117 are implemented using separate integrated circuits, the physical interface 204 includes one or more wires or cables that provide a signaling path between a plurality of pins of channel circuit 115 and a plurality of pins of channel circuit 117. As used herein, the terms "pins" shall refer generically to any structure for coupling signals from a circuit for connection to an external device. As such, the term pins shall include pads, bonding wires, and other electrical, electromagnetic or optical connections.

Channel interface 128 includes a bidirectional transmission path 216 between the controller circuit 117 and the channel circuit 115 that is operable to transfer disk read data and disk write data, to provide the controller circuit access to read from, and write to, the channel register 92, and to provide the channel circuit access to read from, and write to, the controller register 94. However, other data transfers, for interface management or for other control and signaling purposes are likewise possible with the broader scope of the present invention. Providing the channel circuit 115 access to read from, and write to, the controller register 94, and providing the controller circuit access to read from, and write to, the channel register 92, allows the channel interface 128 to support certain data transfers, such as DMA transfers of blocks of data corresponding to, for instance, one or more sectors of data, or fractions thereof, from the drive. In operation, these data transfers are formatted with a command code, such as: a code for a channel register write, channel register read, controller register write, or controller register read, etc; command specific data, such as the register address, write data, data size, etc; and other control information, headers footers, error detection and/or correction codes, etc. In an embodiment of the present invention, the bidirectional transmission path 216 includes separate forward and reverse transmission paths that allow bidirectional transactions that optionally include requests for transfer, transfers and/or acknowledgement or transfers, to be split between the forward and reverse paths based on the direction of command and data flow.

In particular, bidirectional transmission path 216 can include two separate paths, such as a transmit path from controller interface module 202 to channel interface module 200 and a receive path from channel interface module 200 to controller interface module 202. The transmit path can include the following basic set of communications, in addition to acknowledgements and other control communications:
  A disk data write that contains a set or subset of a sector's write data (32 bytes for example), that is the second portion of a split transaction initiated from the receive path;
  Channel register write that contains the register address, write data, and optionally control information such as data size;
  Controller register read that contains the data from controller register in the second portion of a split transaction initiated from the receive path;
  Channel register read that contains the register address and optionally other control information to initiate the read of channel register data in the first part of a split transaction.

The receive path can include the following basic set of communications in addition to acknowledgements and other control communications:
  Disk data read that contains an address tag, a set or subset of a sector's read data (32 bytes for example), and optionally control information such as length;
  Disk data write that contains an address tag and optionally control information such as length, that is the first portion of a split transaction;
  Controller register write that contains the register address, write data, and optionally control information such as data size;
  Controller register read that contains the register address and optionally other control information to initiate the read of controller register data in the first part of a split transaction;
  Channel register read that contains the data from channel register in the second portion of a split transaction initiated from the transmit path.

In addition, channel interface 128 includes a unidirectional transmission path 218 that is operable to transfer data from the channel circuit 115 to the controller circuit 117 such as servo data, interrupt requests for the processing module 132, and channel trace data for trace module 136. In an embodiment of the present invention, the unidirectional transmission path 218 is implemented separately from the bidirectional transmission path to provide a dedicated pathway for realtime transfers of servo data and interrupts, whose timing is potentially important to the operation of the controller circuit 117.

Figure 4:
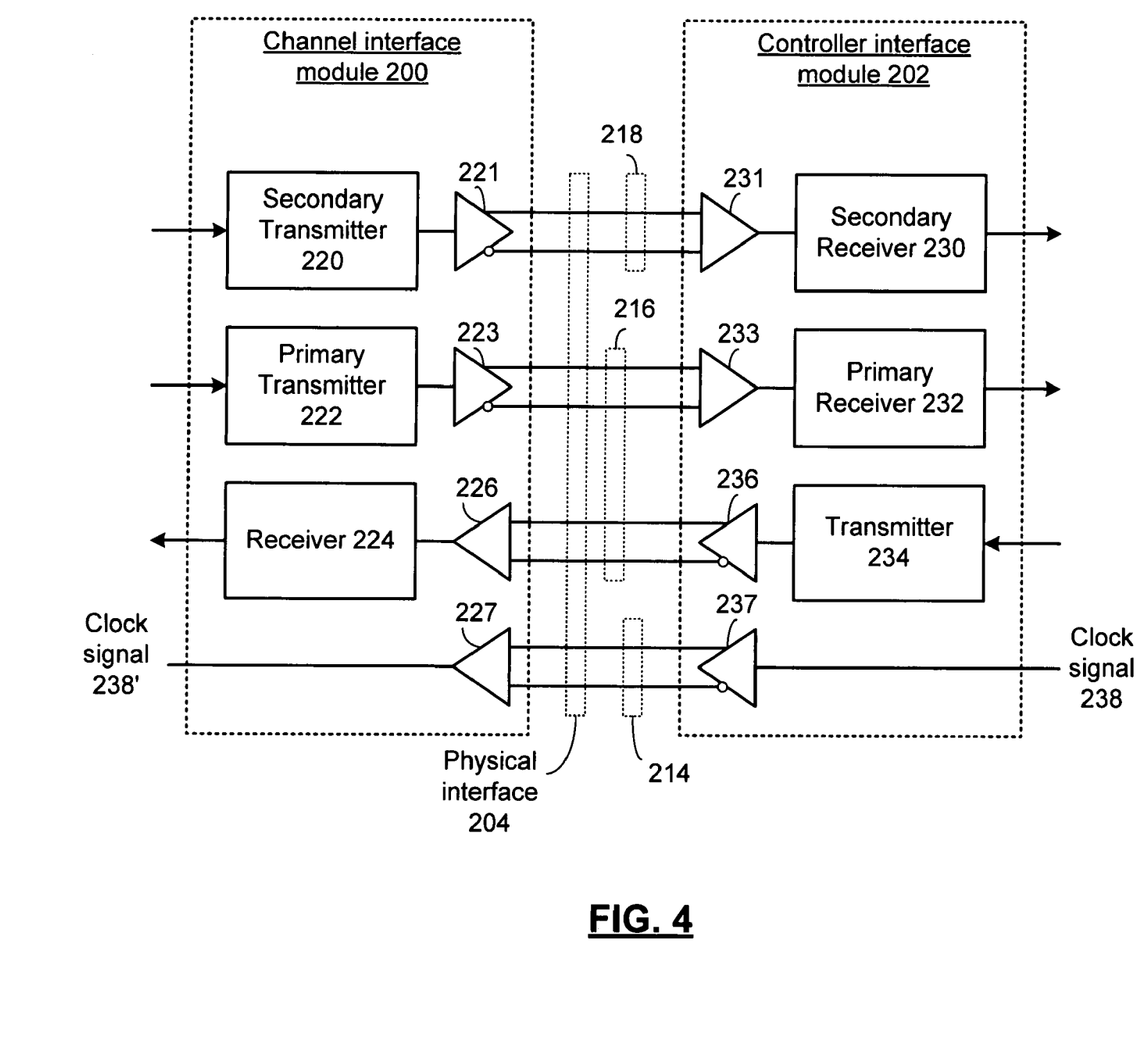
FIG. 4 presents a block diagram representation of a channel interface module 200, controller interface module 202 and a physical interface 204 in accordance with an embodiment of the present invention.

FIG. 4 presents a block diagram representation of a channel interface module 200, controller interface module 202 and a physical interface 204 in accordance with an embodiment of the present invention. In particular bidirectional transmission path 214 is implemented with differential line drivers 236 and 223, differential line amplifiers 226 and 233, and transmitter/receiver pairs 234/224 and 222/232. Unidirectional transmission path 218 is implemented with differential line driver 221, differential line amplifier 231, and transmitter/receiver pair 220/230.

In an embodiment of the present invention, the bidirectional transmission path 216, and unidirectional transmission path 218 form a plurality of parallel arranged paths that are part of a serializer/de-serializer (SERDES) interface. In particular, bidirectional transmission path 216 contains two differential line pairs and the unidirectional transmission path 218 includes one differential line pair. Parallel data is serialized for high-speed transfer over physical interface 204 at data rates that can range from a few Mbits/sec to 10 Gbits/sec or more. Transmitter 234, primary transmitter 222 and secondary transmitter 220 encode the incoming data using signaling such as low voltage differential signaling (LVDS) that is transferred across the parallel paths by differential line drivers 236, 223 and 221 operating in conjunction with differential line amplifiers 226, 233, and 231. Receiver 224, primary receiver 232 and secondary receiver 230 operate to convert the LVDS back into its corresponding data.

In addition to the bidirectional transmission path 216 and unidirectional transmission path 218, physical interface 204 includes unidirectional transmission path 214 that couples a clock signal 238 from the controller circuit 117 to the channel circuit 115. In this configuration, differential line driver 237 transfers clock signal 238 over the physical interface for recovery by line amplifier 227 to form clock signal 238'. In an embodiment of the present invention, the channel circuit 115 can operate from clock signal 238' provided by controller circuit 117, without the need to provide its own oscillator. In particular, the processing module 122, and an error correcting code decoder included in disk formatter 125 operate based on a constant frequency clock that is divided down from clock signal 238'. The servo formatter 120 and servo path circuits of read/write channel 140 run from a servo phase-locked loop having a reference frequency divided down from the interface clock 238'. In addition, the other data related circuits of the disk formatter and the data path of read/write channel 140 run from a data phase-locked loop in the channel circuit 115 from a reference frequency divided down from the clock 238', such as the reference frequency used by the servo phase-locked loop.

In this configuration, physical interface 204 includes eight signal lines that make up four parallel signal paths that is advantageous from the standpoint of silicon area, power, bandwidth and low pin count. In this fashion, the physical interface can include eight circuit board traces, wires or other connections that couple eight pins of channel circuit 115 to eight pins of controller circuit 117. However, other configurations are likewise possible. For instance, fewer than eight signal lines can be used to implement the physical interface 204 by employing one or more common ground connections. In other alternatives, the physical interface may omit the transfer of clock signal 238 and the unidirectional transmission path 214, or provide a clock signal in the opposite direction, from channel circuit 115 to controller circuit 117.

Figure 5:
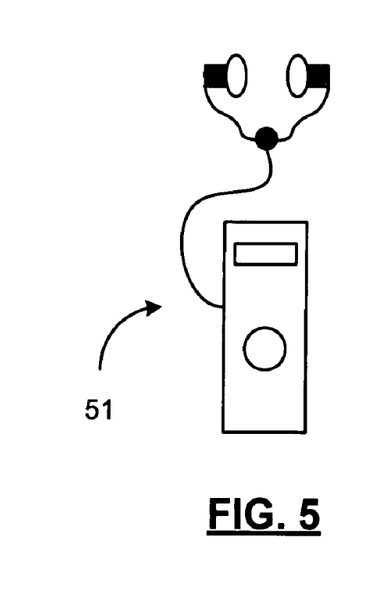
FIG. 5 presents a pictorial representation of a handheld audio unit 51 in accordance with an embodiment of the present invention.

FIG. 5 presents a pictorial representation of a handheld audio unit 51 in accordance with an embodiment of the present invention. In particular, disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 6:
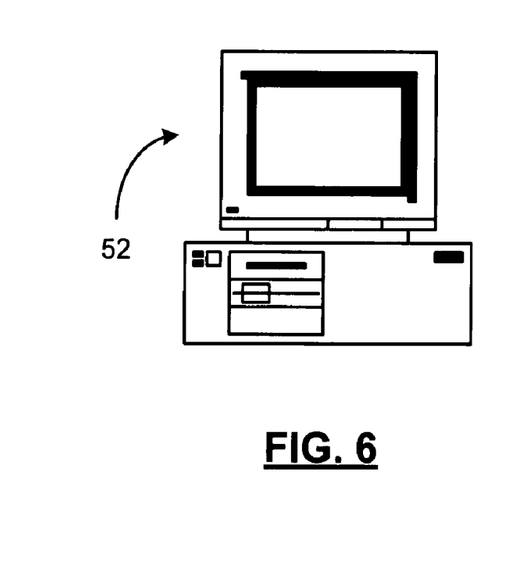
FIG. 6 presents a pictorial representation of a computer 52 in accordance with an embodiment of the present invention.

FIG. 6 presents a pictorial representation of a computer 52 in accordance with an embodiment of the present invention. In particular, disk drive unit 100 can include a small form factor magnetic hard disk whose disk 102 has a diameter 1.8" or smaller, a 2.5" or 3.5" drive or larger drive for applications such as enterprise storage applications. Disk drive unit 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 7:
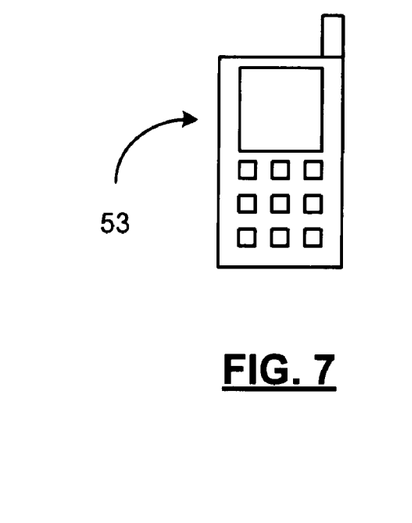
FIG. 7 presents a pictorial representation of a wireless communication device 53 in accordance with an embodiment of the present invention.

FIG. 7 presents a pictorial representation of a wireless communication device 53 in accordance with an embodiment of the present invention. In particular, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (Joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 8:
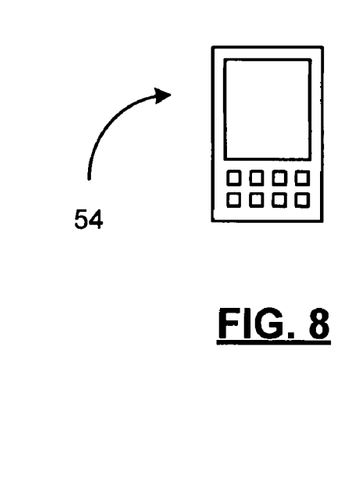
FIG. 8 presents a pictorial representation of a personal digital assistant 54 in accordance with an embodiment of the present invention.

FIG. 8 presents a pictorial representation of a personal digital assistant 54 in accordance with an embodiment of the present invention. In particular, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (Joint photographic expert group) files, bitmap files and files stored in other graphics formats, emails, webpage information and other information downloaded from the Internet, address book information, and/or any other type of information that may be stored in a digital format.

Figure 9:
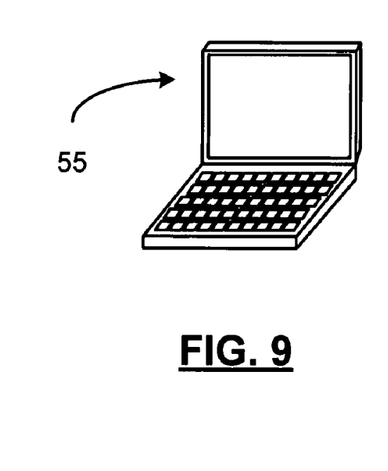
FIG. 9 presents a pictorial representation of a laptop computer 55 in accordance with an embodiment of the present invention.

FIG. 9 presents a pictorial representation of a laptop computer 55 in accordance with an embodiment of the present invention. In particular, disk drive unit 100 can include a small form factor magnetic hard disk whose disk 102 has a diameter 1.8" or smaller, or a 2.5" drive. Disk drive unit 100 is incorporated into or otherwise used by laptop computer 52 to provide general purpose storage for any type of information in digital format.

Figure 10:
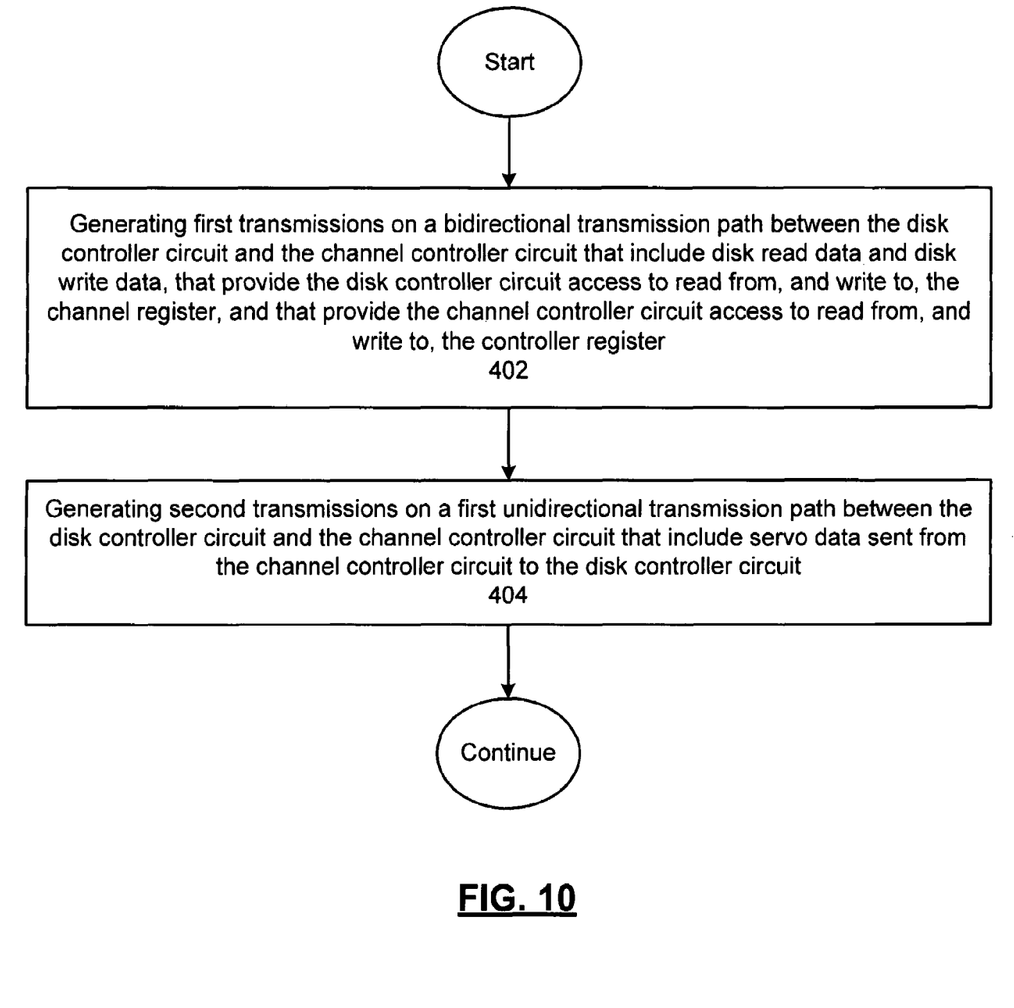
FIG. 10 presents a flowchart representation of a method in accordance with an embodiment of the present invention.

FIG. 10 presents a flowchart representation of a method in accordance with an embodiment of the present invention. In particular, a method is presented for use in coupling a channel circuit, such as channel circuit 115 to a controller circuit, such as controller circuit 117 of a disk drive, such as disk drive 100. The channel circuit includes a channel register, such as channel register 92, and the controller circuit includes a controller register, such as controller register 94, used in the execution of read and write commands. In step 402, first transmissions are generated on a bidirectional transmission path between the controller circuit and the channel circuit that include disk read data and disk write data, that provide the controller circuit access to read from, and write to, the channel register, and that provide the channel circuit access to read from, and write to, the controller register. In step 404, second transmissions are generated on a first unidirectional transmission path between the controller circuit and the channel circuit that include servo data sent from the channel circuit to the controller circuit.

In an embodiment of the present invention, the second transmissions further include interrupt requests and/or channel trace data sent from the channel circuit to the controller circuit. In addition, step 402 includes generating the first transmissions on two differential line pairs and step 404 includes generating the second transmissions on one differential line pair. Further, step 402 includes encoding the first transmissions using low voltage differential signaling.

Figure 11:
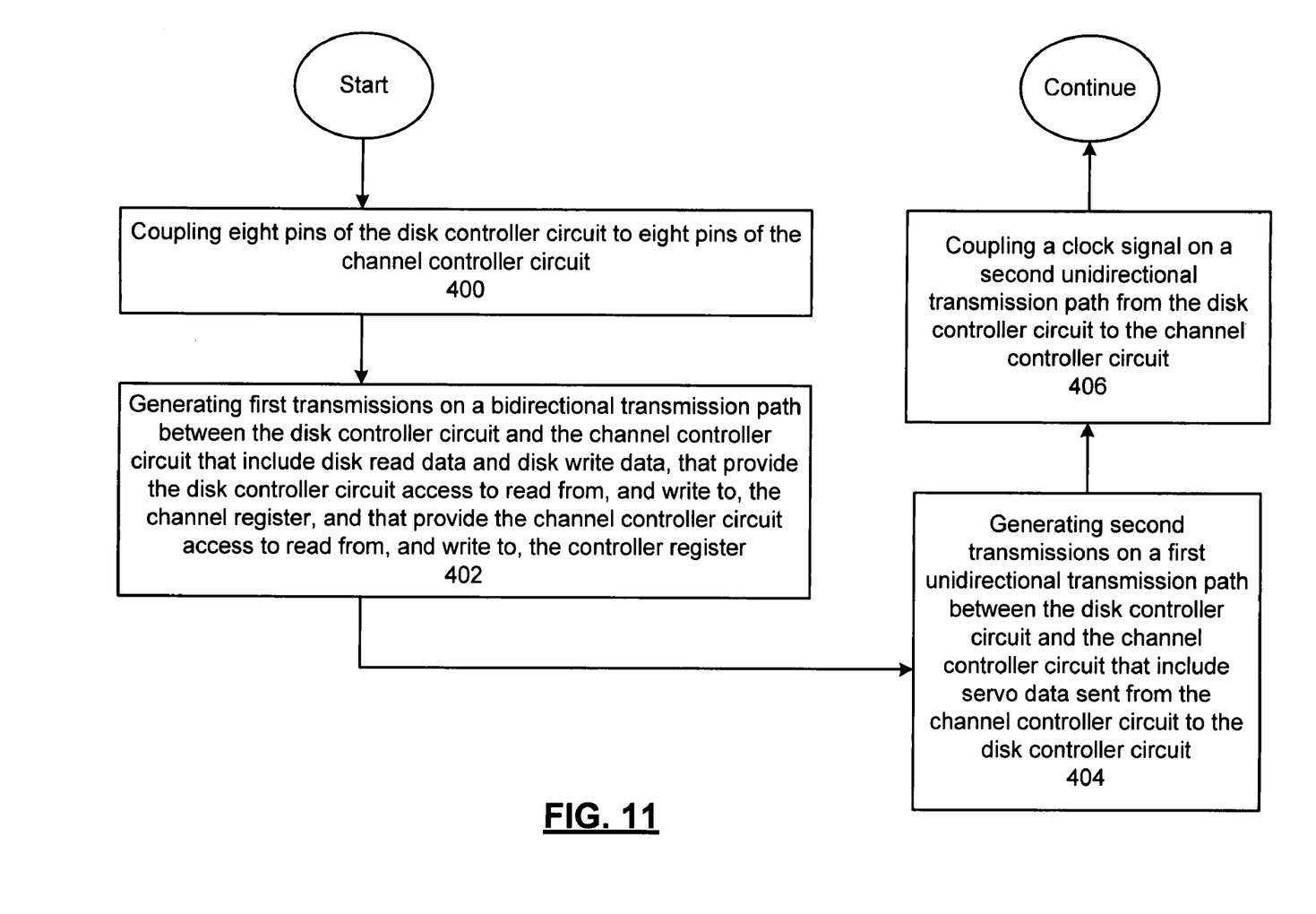
FIG. 11 presents a flowchart representation of a method in accordance with an embodiment of the present invention.

FIG. 11 presents a flowchart representation of a method in accordance with an embodiment of the present invention. In particular, a method is presented that includes several steps described in conjunction with FIG. 10 that are referred to by common reference numerals. In particular, the method of FIG. 11 further comprises the optional step 400 of coupling eight pins of the controller circuit to eight pins of the channel circuit and optional step 406 of coupling a clock signal on a second unidirectional transmission path from the controller circuit to the channel circuit.

While the present invention has been described in terms of a magnetic disk, other nonmagnetic storage devices including optical disk drives including compact disks (CD) drives such as CD-R and CD-RW, digital video disk (DVD) drives such as DVD-R, DVD+R, DVD-RW, DVD+RW, etc can likewise be implemented in accordance with the functions and features of the presented invention described herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to order of magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a disk controller and channel interface. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A disk controller for use in a disk drive comprising:
   a channel integrated circuit (IC) for writing data to and reading data from the disk drive, the channel IC including a channel register;
   a controller integrated circuit (IC) that controls the operation of a plurality of drive devices, and that arbitrates execution of read and write commands and the flow of data between a host device and the channel IC, the controller IC including a controller register;
   a channel interface, operably coupled to the channel IC and the controller IC, the channel interface including:
      a bidirectional transmission path coupled to the controller IC and the channel IC that transfers disk read data and disk write data between the controller IC and the channel IC; and
      a first unidirectional transmission path coupled to the controller IC and the channel IC that transfers servo data from the channel IC to the controller IC;
      wherein the controller IC reads from the channel register and writes to the channel register via the bidirectional transmission path, and the channel IC reads from the controller register and writes to the controller register via the bidirectional transmission path.

2. The disk controller of claim 1 wherein the channel interface further includes a second unidirectional transmission path that couples a clock signal from the controller IC to the channel IC.

3. The disk controller of claim 1 wherein the first unidirectional transmission path is further operable to transfer interrupt requests from the channel IC to the controller IC.

4. The disk controller of claim 1 wherein the first unidirectional transmission path is further operable to transfer channel trace data from the channel IC to the controller IC.

5. The disk controller of claim 1 wherein the bidirectional transmission path contains two differential line pairs and the unidirectional transmission path includes one differential line pair.

6. The disk controller of claim 5 wherein at least one of: the bidirectional transmission path, and the unidirectional transmission path includes a low voltage differential signaling path.

7. The disk controller of claim 1 wherein the channel interface includes four differential line pairs for coupling eight pins of the controller IC to eight pins of the channel IC.

8. A channel interface for coupling a channel circuit to a controller circuit of a disk drive, the channel circuit including a channel register and the controller circuit including a controller register used in the execution of read and write commands, the channel interface comprising:
- a bidirectional transmission path coupled to the controller circuit and the channel circuit that transfers disk read data and disk write data between the controller circuit and the channel circuit; and
- a first unidirectional transmission path coupled to the controller circuit and the channel circuit that transfers servo data from the channel circuit to the controller circuit;
- wherein the controller IC reads from the channel register and writes to the channel register via the bidirectional transmission path, and the channel IC reads from the controller register and writes to the controller register via the bidirectional transmission path.

9. The channel interface of claim 8 further comprising:
a second unidirectional transmission path that couples a clock signal from the controller circuit to the channel circuit.

10. The channel interface of claim 8 wherein the first unidirectional transmission path is further operable to transfer interrupt requests from the channel circuit to the controller circuit.

11. The channel interface of claim 8 wherein the first unidirectional transmission path is further operable to transfer channel trace data from the channel circuit to the controller circuit.

12. The channel interface of claim 8 wherein the bidirectional transmission path contains two differential line pairs and the unidirectional transmission path includes one differential line pair.

13. The channel interface of claim 12 wherein at least one of: the bidirectional transmission path, and the unidirectional transmission path includes a low voltage differential signaling path.

14. The channel interface of claim 8 wherein the channel interface includes four differential line pairs for coupling eight pins of the controller circuit to eight pins of the channel circuit.

15. A method for use in coupling a channel circuit to a controller circuit of a disk drive, the channel circuit including a channel register and the controller circuit including a controller register used in the execution of read and write commands, the method comprising:
- generating first transmissions on a bidirectional transmission path between the controller circuit and the channel circuit that include disk read data and disk write data, command codes from the controller circuit to read from the channel register, and write to the channel register, and command codes from the channel circuit to read from the controller register and write to the controller register; and
- generating second transmissions on a first unidirectional transmission path between the controller circuit and the channel circuit that include servo data sent from the channel circuit to the controller circuit.

16. The method of claim 15 further comprising:
coupling a clock signal on a second unidirectional transmission path from the controller circuit to the channel circuit.

17. The method of claim 15 wherein the second transmissions further include interrupt requests from the channel circuit to the controller circuit.

18. The method of claim 15 wherein the second transmissions further include channel trace data from the channel circuit to the controller circuit.

19. The method of claim 15 wherein the step of generating the first transmissions includes generating the first transmissions on two differential line pairs and the step of generating the second transmissions includes generating the second transmissions on one differential line pair.

20. The method of claim 19 wherein the step of generating the first transmissions includes encoding the first transmissions using low voltage differential signaling.

21. The method of claim 15 further comprising the step of:
coupling eight pins of the controller circuit to eight pins of the channel circuit.

* * * * *